Sept. 16, 1930.　　　C. G. STRANDLUND　　　1,775,835
CULTIVATOR
Original Filed Aug. 26, 1921　　3 Sheets-Sheet 1

Inventor
Carl G. Strandlund,
By John L. Jackson.
Attorney

Witness
Milton Lenoir

Sept. 16, 1930.     C. G. STRANDLUND     1,775,835
CULTIVATOR
Original Filed Aug. 26, 1921    3 Sheets-Sheet 3
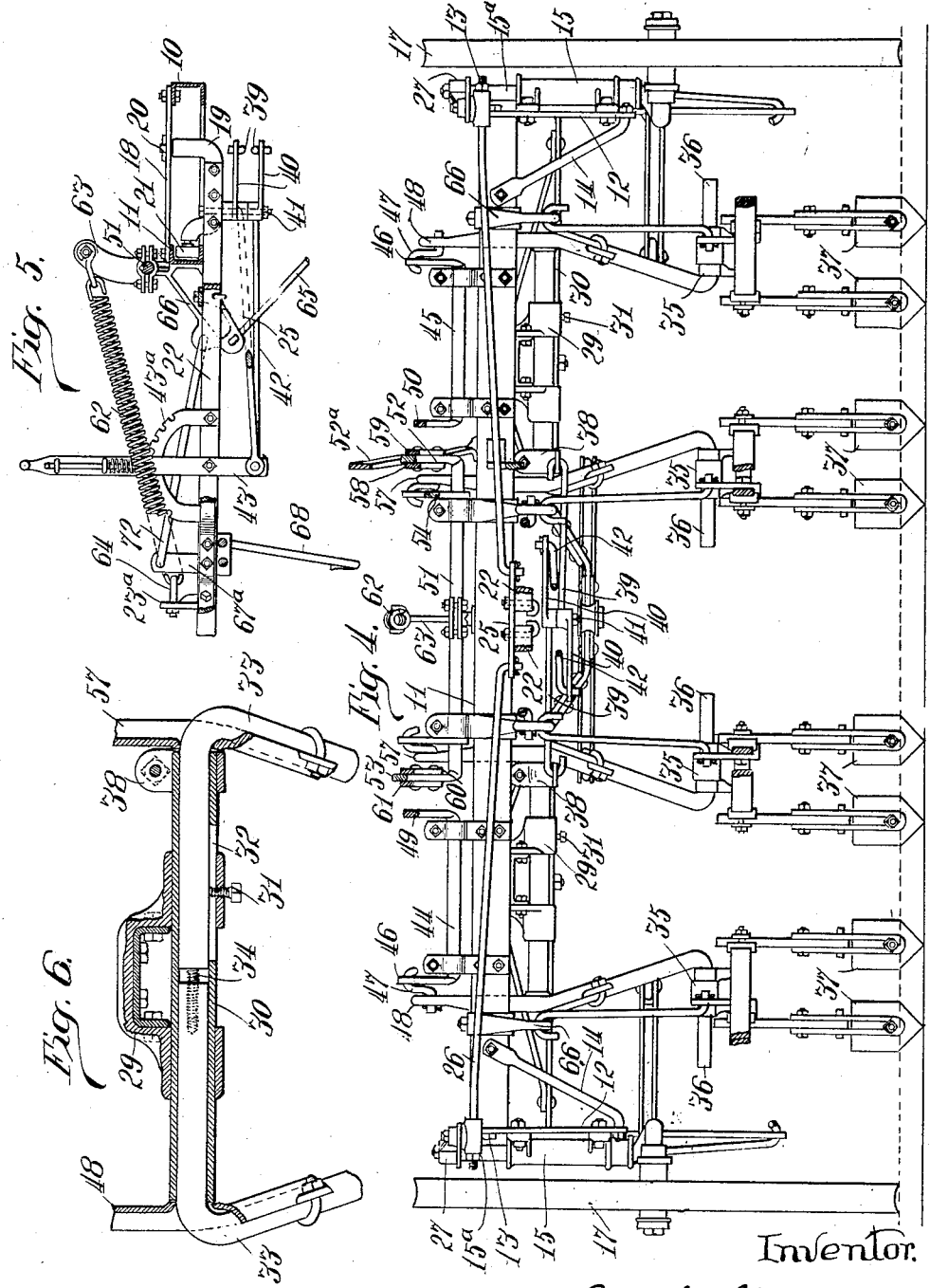

Patented Sept. 16, 1930

1,775,835

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

CULTIVATOR

Original application filed August 26, 1921, Serial No. 495,694. Patent No. 1,654,561, dated January 3, 1928. Divided and this application filed May 23, 1927. Serial No. 193,391.

This invention relates to cultivators of the type comprising a frame provided at its ends with dirigible wheels and having means whereby the wheels may be turned laterally in unison for steering purposes, and the frame may be moved bodily to the right or left about the points of contact of the wheels with the ground as pivots. A cultivator of this type is shown and described in my prior Patent 1,654,561, granted Jan. 3, 1928, of which this is a division. The features which constitute the subject-matter of this application relate to the means for controlling the steering position of the wheels, and also have to do with the means for raising the cultivator rigs.

Referring to the drawings in which like numerals indicate identical parts:

Fig. 4 is a rear elevation on line 4—4 of Fig. 1;

Fig. 5 is a cross section on line 5—5 of Fig. 1; and

Fig. 6 is a detail view of the arch mounting corresponding to a section taken on the line 6—6 of Fig. 1.

Figure 1:
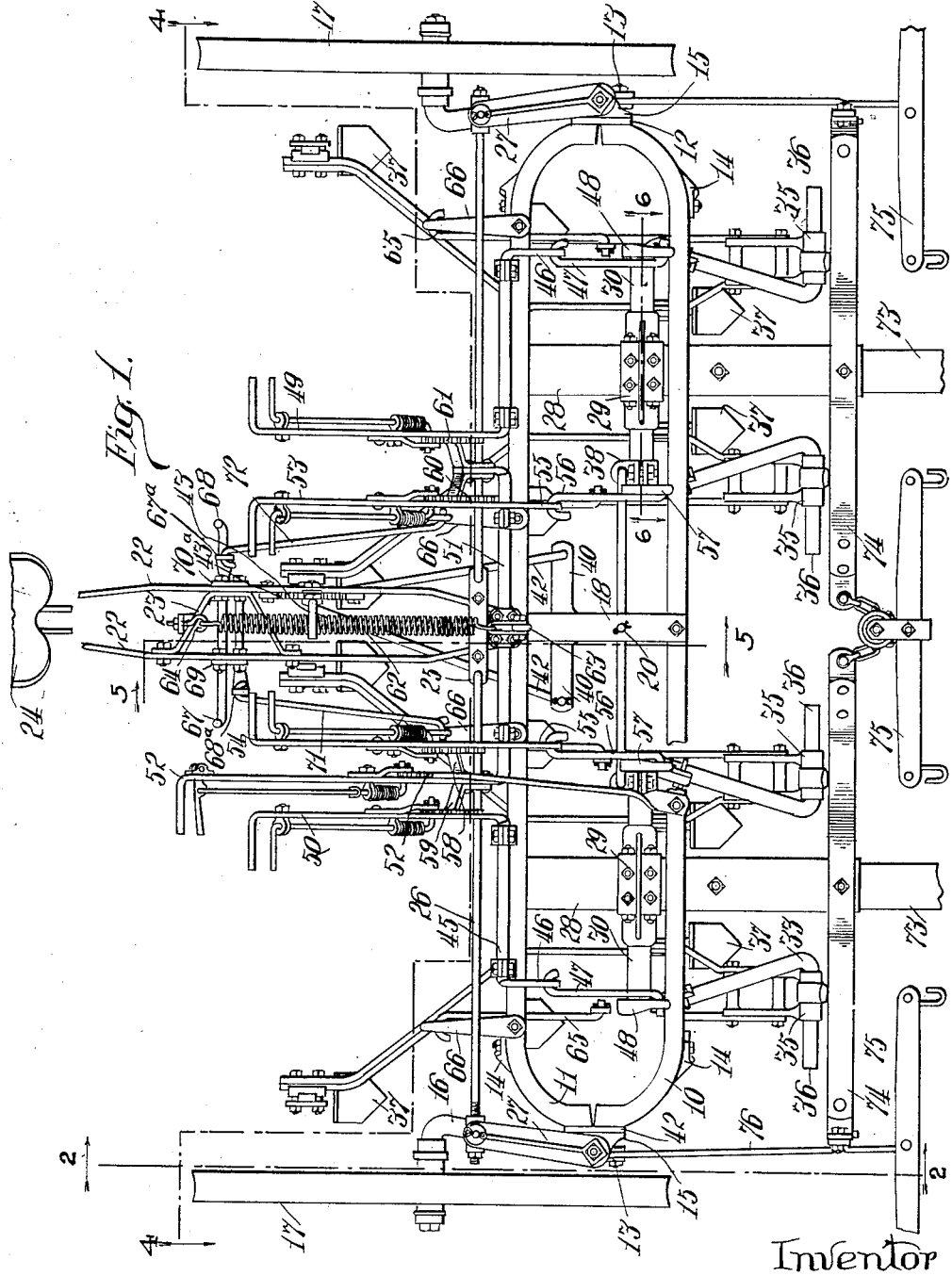
Fig. 1 is a top plan view of my cultivator.
Figure 2:
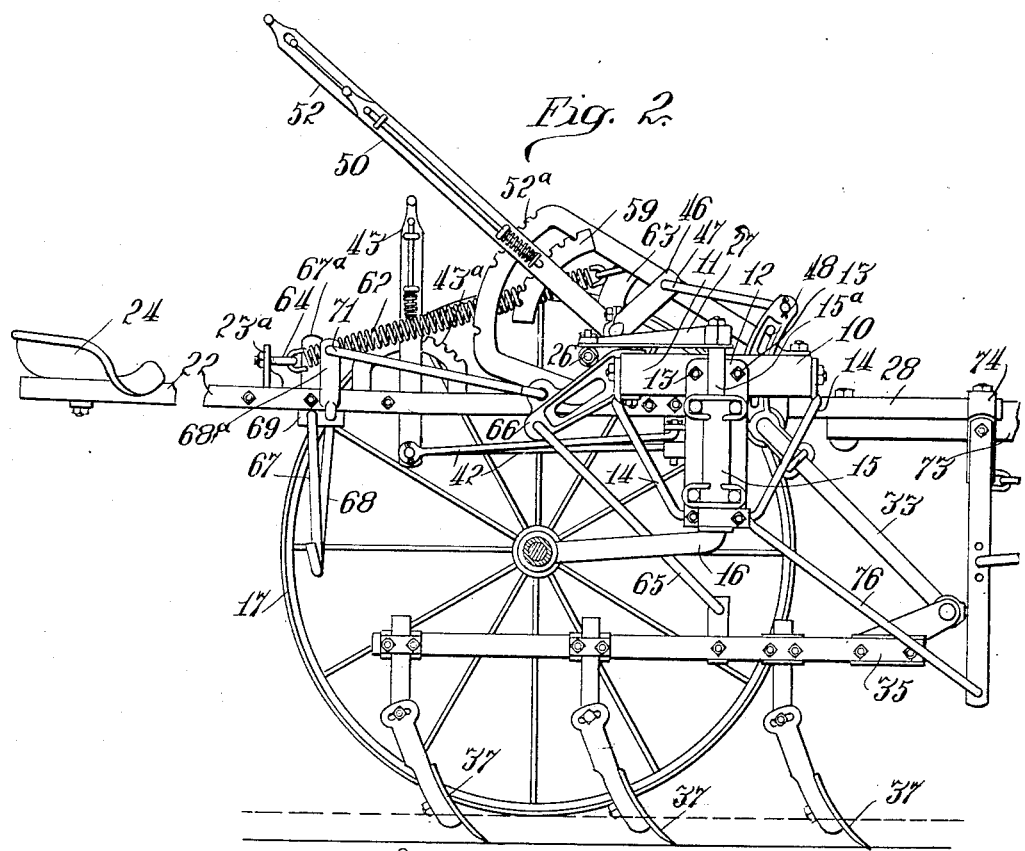
Fig. 2 is a side elevation on line 2—2 of Fig. 1 showing the cultivator rigs in lowered position.
Figure 3:
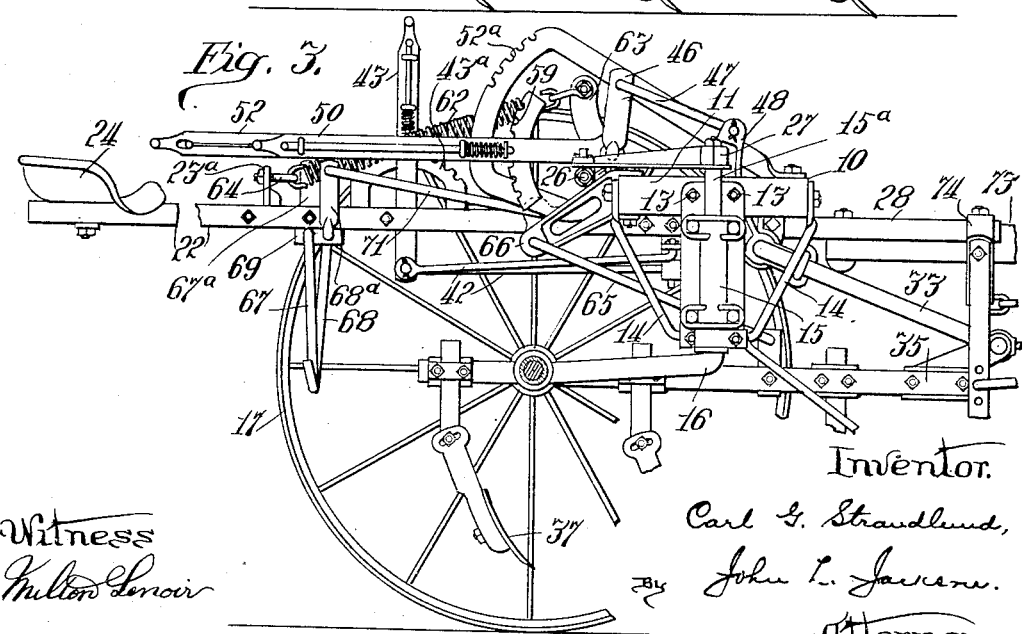
Fig. 3 is a similar view to Fig. 2 but with the cultivator rigs raised.

In the illustrated construction the frame of the cultivator is composed of front and rear channel bars 10 and 11, which are bent and secured together at each end by means of plate like members 12 and bolts 13. The members 12 depend from the frame bars and are further secured by means of brace rods 14 which are attached at their lower ends to the lower portion of the members 12 and at their upper ends to the frame bars. Castings 15 are secured to the members 12 and form a bearing for vertical portion 15ª of rearwardly extending crank axles 16 which have outturned portions upon which supporting wheels 17 are journaled.

A bar 18 connects the frame bars 10 and 11 intermediate their length. A supporting member 19 is pivoted at one end to the bar 18 at 20 and upon its rear portion carries a roller 21 which is supported by and rolls upon the channel frame bar 11, as shown in Figure 5.

Seat bars 22 are secured at their forward ends to the member 19 and extend rearwardly in parallel relationship for most of their length, and are secured together by means of a U-shaped brace 23. At their rearward portions the seat bars 22 are bent toward each other to form a support for a seat 24. A transversely positioned strap 25 is secured to the seat bars 22 to which strap transverse rods 26 are attached at their inner ends. The outer ends of the rods 26 are attached to arms 27 which are non-rotatably secured to the upper portions 15ª of the axles 16. Therefore movement of the seat bars 22 around their pivot 20 will act, through the connection described, to guide or swing the frame bodily to the right or left about the points of contact of the wheels 17 with the ground as pivots. The direction of movement of the frame depends on the direction the seat bars 22 are swung by means of foot levers hereinafter described.

On each side, parallel with and equidistant from the bar 18, channel bars 28 are secured to the frame bars 10 and 11. Brackets 29 are secured to the channel bars 28 and form transverse horizontal supports for bearings 30, in this instance sections of pipe. The bearings 30 are free to move longitudinally in the brackets 29, but are held from rotary movement by means of set screws 31 which extend through the brackets 29 and engage a slot 32 in the bearings 30. The bearings 30 receive the upper horizontal portions of side members 33, the upper horizontal portion of one of the side members having a threaded reduced portion 34 adapted to engage a tapped opening in the horizontal portion of the other member, as shown in Figure 6. It will be understood each bearing 30 and its side members 33 as an entirety comprise a rig carrying arch. With this construction, which is that which I prefer to use, it will be evident that each side member 33 of the rig carrying arches is capable of fore and aft swinging movement in the bearing 30; also that the side members 33 are held from longitudinal movement in relation to the bearing 30 by the threaded portion 34 and the depending portions of the members 33 which abut against the ends of the bearings 30, but the rig carrying arch, as an entirety, is supported in the brackets 29 in a manner to be moved bodily transversely by means hereinafter described. This particular construction is not herein claimed as it is a part of the subject-matter of my said prior Patent 1,654,561. The rig carrying arches extend downwardly and forwardly from the brackets 29 and have laterally extending lower portions which form transverse horizontal axes 36, upon which the forward portions of rigs 35 are journaled, in a common and well known manner, for independent vertical movement. The rigs 35 carry the usual cultivating devices 37. The rigs and frame are pivotally connected together at points rearwardly of the rig carrying arches by means hereinafter described.

By positioning the depending portions of the rig carrying arches forwardly of the vertical a number of advantages accrue, namely; it permits the rigs being positioned well forward so the operator may at all times have a better view of their operation; it provides better penetration for the shovels 37 as the forward movement of the cultivator tends to force them into the ground; and it provides means for balancing the frame of the cultivator when the shovels are raised, for when raised the weight of the rigs is transferred forwardly thereby balancing the weight of the operator on the seat 24.

Clips 38 are secured to the inner ends of the bearings 30, and links 39 are connected at one end to the clips 38 and extend toward the center of the cultivator, where they are connected to forwardly extending arms of bell cranks 40 mounted on a vertical pivot 41 secured to the supporting member 19. Links 42 are connected at their forward ends to laterally extending arms of the bell cranks 40, and are connected at their rearward ends to the lower end of a lever 43. The lever 43 is pivoted intermediate its length to one of the seat bars 22 and carries the usual latch and dog device adapted to engage one of a series of notches in a sector 43$^a$ secured to the seat bar 22. By stroking the lever 43, it is evident that the arches carrying the rigs 35 will be moved relatively to the bracket 29 by reason of the connections described, and consequently the arches and rigs will be brought closer together or spread farther apart, depending on whether the operator strokes the lever 43 rearwardly or forwardly.

The cultivating rigs may be raised and lowered either independently or simultaneously in the following manner: Rock shafts 44 and 45 are journaled in suitable bearings on the frame bar 11, and have, on their outer ends, forwardly extending arms 46 which are connected by means of links 47 to castings 48 secured to the outer members 33 of the rig carrying arches. The inner ends of the rock shafts 44 and 45 have upwardly extending arms which form hand levers 49 and 50. In suitable bearings on the frame bar 11, between and in alinement with the rock shafts 44 and 45, is journaled a rock shaft 51, on one end of which is a master lever 52 provided with the usual latch and dog device adapted to engage with notches in a sector 52$^a$ secured to the frame. Levers 53 and 54 are loosely mounted on the outer portions of the rock shaft 51 and have forwardly extending arms 55 connected by means of links 56 to castings 57 secured to the inner members 33 of the rig carrying arches. A sector 58 is secured on one side of the master lever 52 and has notches with which a latch on the lever 54 engages, and on the opposite side of the lever 52 is secured a sector 59 having notches with which a latch on the lever 50 engages. The end of the rock shaft opposite the lever 52 is upturned and has secured thereto a sector 60, having notches with which a latch on lever 53 engages, and a sector 61 having notches with which a latch on lever 49 engages. By this arrangement of parts it is apparent that each cultivating rig may be raised or lowered independently of the others by actuating the lever to which it is connected, and that all the rigs may be raised or lowered simultaneously by operating the master lever 52. To aid the operator in lifting the rigs 35 a spring 62 is connected at one end to a casting 63 secured to the shaft 51, and at the other end to an eye-bolt 64 secured to a lug 23$^a$ on the brace 23, which as has been stated is secured to the seat bars 22.

To provide a horizontal parallel lifting action for the rigs 35 links 65 are pivotally connected at their lower ends to the rigs 35 at points rearwardly of and in horizontal alinement with the axes 36, and extend upwardly and rearwardly in parallel relationship to the members 33 of the rig carrying arches and are pivotally connected at their upper ends to a frame bracket 66 at a point in horizontal alinement with the bearings 30. It is evident that by reason of the links 65 being parallel with and substantially the same length as the depending portions of the rig carrying arches, as the latter are swung forwardly and upwardly the rigs 35 will be raised in horizontal parallel relationship.

The cultivator is guided by means of foot levers 67 and 68, journaled in bearings 69 and 70 secured to the seat bars 22. The foot lever 67 is provided with an upwardly extending arm 67$^a$ at the opposite side of the seat support from that at which said foot lever depends, which arm is connected by means of a link 72 with one of the inner frame brackets 66, so that said foot lever 67 is connected with the frame of the cultivator at the opposite side of the seat support from that at which said lever is placed. The foot lever 68 is located at the opposite side of the seat support from the lever 67, and in like manner it is provided with an upwardly extending arm 68ª that is connected by a link 71 to one of the inner frame brackets 66 at the opposite side of the seat support from that at which the lever 68 is located. This arrangement is shown in Figs. 1, 2, 3 and 5. As best shown in Fig. 1 the links 71, 72 converge rearwardly. It is evident that by pushing forward on the lower end of either of the foot levers, the seat bars 22 will be swung laterally in one direction or the other about the pivot 20, and the frame will move bodily endwise, or transversely of the machine, in the opposite direction, guiding the cultivator as an entirety in that direction. For example when the operator intends to guide the cultivator to the right of the plant rows, which will be to the left as viewed in Figure 1, the operator pushes his right foot against the lower end of the foot lever 67. In so doing, the operator moves himself and the seat 24 to the right as seen in Figure 1, due to the fact that the upper end of the foot lever 67ª is connected to the bracket 66 on the frame 11 by the link 72. When ever pressure is applied to the lower end of the foot lever 67 the upper end 67ª moves laterally to the right in Figure 1 so as to be directly behind the point of connection of the link 72 with the bracket 66. This also moves the seat bars 22 in the same direction with respect to the frame 11 about the point 20 thereon, and which through the rods 26 swings each of the arms 27 and the axles 16 clockwise about their axis in the castings 15. The wheels being in contact with the ground, and at points to the rear of the frame 11, the latter therefore moves to the left, as seen in Figure 1, carrying with it the rigs 35. It will be noted that, as clearly shown in Fig. 1, the spring 62 lies in the median line of the cultivator when the seat bars are in their normal position, at which time the wheels are also in their normal position. When, however, the seat bars are swung laterally to guide the wheels to one side or the other, and the frame is consequently moved in the direction opposite to that in which the seat bars swing, as the rear end of said spring is connected with the seat bars and the front end thereof is connected with the frame, whenever the seat bars are swung laterally the spring is put under greater tension. Said spring, therefore, tends to return the seat support to its normal position and to hold it in such position, and consequently it serves the double purpose of aiding in lifting the rigs and in maintaining the wheels in their normal position.

Draft poles 73 are connected at their rearward portions to the frame. The usual evener bars 74, to which are attached singletrees 75, are pivotally connected to the members 28, and at their outer ends the evener bars 74 are connected with the frame by means of draft links 76.

What I claim as my invention and desire to secure by Letters Patent, is—

1. In a cultivator, the combination of a frame, crank axles having vertical portions journaled on the frame, wheels mounted on the crank portions of said axles, a laterally swinging seat support pivotally mounted on the frame, means operated by lateral swinging of said seat support for turning said crank axles in unison to steer said wheels, foot levers pivotally connected with said seat support and depending therefrom at opposite sides thereof, and connections between said foot levers respectively and the frame whereby forward movement of one or the other of said levers will swing the seat support laterally in one direction and will guide the cultivator in the opposite direction.

2. In a cultivator, the combination of a frame, crank axles having vertical portions journaled on the frame, wheels mounted on the crank portions of said axles, a laterally swinging seat support pivotally mounted on the frame, means operated by lateral swinging of said seat support for turning said crank axles in unison to steer said wheels, and foot levers pivotally connected with said seat support and depending therefrom at opposite sides thereof, each of said foot levers having an upwardly extending arm connected with the cultivator frame at the opposite side of said seat support, whereby forward movement of one or the other of said foot levers will swing the seat support laterally in one direction and will guide the cultivator in the opposite direction.

3. In a cultivator, the combination of a frame, crank axles having vertical portions journaled on the frame, wheels mounted on the crank portions of said axles, a laterally swinging seat support pivotally mounted on the frame, means operated by lateral swinging of said seat support for turning said crank axles in unison to steer said wheels, foot levers operable to swing said seat support laterally in one direction or the other, and a spring extending substantially longitudinally of the cultivator between said seat support and said frame and serving to resist lateral movement of said seat support in either direction from its normal position.

4. In a cultivator, the combination of a frame, crank axles having vertical portions journaled on the frame, wheels mounted on the crank portions of said axles, a laterally swinging seat support pivotally mounted on the frame, means operated by lateral swinging of said seat support for turning said crank axles in unison to steer said wheels, foot levers operable to swing said seat support laterally in one direction or the other, cultivator rigs connected with said frame to swing vertically, means operable to raise or lower said cultivator rigs, and a spring arranged to assist in raising the cultivator rigs and serving also to resist lateral movement of said seat support in either direction from its normal position.

5. In a cultivator, the combination of a frame, crank axles having vertical portions journaled on the frame, wheels mounted on the crank portions of said axles, a laterally swinging seat support pivotally mounted on the frame, means operated by lateral swinging of said seat support for turning said crank axles in unison to move said frame transversely and to steer said wheels, foot levers operable to swing said seat support laterally, and a spring connected with said seat support extending forwardly therefrom and being connected with said frame at a point in rear of the center of swinging movement of said seat support, said spring acting to resist lateral movement of said seat support in either direction from its normal position.

6. In a cultivator, the combination of a frame, crank axles having vertical portions journaled on the frame, wheels mounted on the crank portions of said axles, a laterally swinging seat support pivotally mounted on the frame, means operated by lateral swinging of said seat support in one direction for turning said crank axles in unison to steer said wheels in the opposite direction, levers fulcrumed on said seat support, and connections between said levers respectively and the frame operable by the actuation of one or the other of said levers to swing the seat support laterally in one direction or the other.

7. In a cultivator, the combination of a frame, crank axles having vertical portions journaled on the frame, wheels mounted on the crank portions of said axles, a laterally swinging seat support pivotally mounted on the frame, means operated by lateral swinging of said seat support in one direction for turning said crank axles in unison to steer said wheels in the opposite direction, and means mounted on and swinging with said seat support, and operable to swing said seat support laterally.

8. In a cultivator, the combination of a frame, crank axles having vertical portions journaled on the frame, wheels mounted on the crank portions of said axles, a laterally swinging seat support pivotally mounted on the frame, means connected with said crank axles and with said seat support back of the pivot thereof for turning said crank axles in unison by lateral swinging of said seat support, and means carried by and swinging with said seat support and connected with the frame, and operable to swing said seat support laterally in either direction.

9. In a cultivator, the combination of a frame, crank axles having vertical portions journaled on the frame, wheels mounted on the crank portions of said axles, a laterally swinging seat support pivotally mounted on the frame, means operated by lateral swinging of said seat support in one direction for turning said crank axles in unison to steer said wheels in the opposite direction, means mounted on and swinging with said seat support, and operable to swing said seat support laterally, and a spring serving to resist lateral movement of said seat support in either direction from its normal position.

10. In a cultivator, the combination of a frame, crank axles having vertical portions journaled on the frame, wheels mounted on the crank portions of said axles, a laterally swinging seat support pivotally mounted on the frame, means connected with said crank axles and with said seat support back of the pivot thereof for turning said crank axles in unison by the lateral swinging of said seat support, means carried by and swinging with said seat support and connected with the frame, and operable to swing said seat support laterally in either direction, and a spring serving to resist lateral movement of said seat support in either direction from its normal position.

11. In a cultivator, the combination of a frame, crank axles having vertical portions journaled on the frame, wheels mounted on the crank portions of said axles, a laterally swinging seat support pivotally mounted on the frame, means operated by lateral swinging of said seat support in one direction for turning said crank axles in unison to steer said wheels in the opposite direction, means mounted on and swinging with said seat support, and operable to swing said seat support laterally, cultivator rigs connected with the frame to swing vertically, means operable to raise or lower said cultivator rigs, and a spring arranged to assist in raising the cultivator rigs and serving also to resist lateral movement of said seat support in either direction from its normal position.

12. In a cultivator, the combination of a frame, crank axles having vertical portions journaled on the frame, wheels mounted on the crank portions of said axles, a laterally swinging seat support pivotally mounted on the frame, means connected with said crank axles and with said seat support back of the pivot thereof for turning said crank axles in unison by lateral swinging of said seat support, means carried by and swinging with said seat support and connected with the frame, and operable to swing said seat support laterally in either direction, cultivator rigs connected with the frame to swing vertically, means operable to raise or lower said cultivator rigs, and a spring arranged to assist in raising the cultivator rigs and serving also to resist lateral movement of said seat support in either direction from its normal position.

13. In a cultivator, the combination of a frame, crank axles having vertical portions journaled on the frame, wheels mounted on the crank portions of said axles, a laterally swinging seat support pivotally mounted on the frame, means operated by lateral swinging of said seat support for turning said crank axles in unison to steer said wheels, a roller interposed between said seat support and said frame to reinforce the pivotal mounting of said seat support on the frame, and a spring serving to resist lateral movement of said seat support in either direction from its normal position.

14. In a cultivator, the combination of a frame, crank axles having vertical portions journaled on the frame, wheels mounted on the crank portions of said axles, a laterally swinging seat support, means pivotally connecting the front portion of said seat support with said frame, means operated by lateral swinging of said seat support for turning said crank axles in unison to steer said wheels, means mounted upon said seat support and actuatable from said seat support for swinging the latter, and a roller carried by said seat support in rear of said pivot means and bearing on said frame for sustaining a portion of the weight imposed on said seat support.

CARL G. STRANDLUND.